(12) United States Patent
ten Thoren

(10) Patent No.: US 8,322,954 B2
(45) Date of Patent: Dec. 4, 2012

(54) TURBINE COMPONENT TRANSPORTATION SYSTEM AND METHOD

(75) Inventor: Rolf Reinfried ten Thoren, Rheine (DE)

(73) Assignee: General Electric Company, Schenectady, NY (US)

(*) Notice: Subject to any disclaimer, the term of this patent is extended or adjusted under 35 U.S.C. 154(b) by 186 days.

(21) Appl. No.: 12/843,220

(22) Filed: Jul. 26, 2010

(65) Prior Publication Data
US 2011/0142589 A1 Jun. 16, 2011

(51) Int. Cl.
*B60P 7/08* (2006.01)
(52) U.S. Cl. .......................................................... 410/44
(58) Field of Classification Search .................. 410/44, 410/45, 33, 53; 280/404; 414/495, 427, 414/459, 589; 105/355
See application file for complete search history.

(56) References Cited

U.S. PATENT DOCUMENTS
7,303,365 B2 * 12/2007 Wobben ........................ 410/45

FOREIGN PATENT DOCUMENTS
| WO | 2005/005286 A1 | 1/2005 |
| WO | 2006/000230 A1 | 1/2006 |
| WO | 2007/147413 A1 | 12/2007 |

OTHER PUBLICATIONS

"Enercon Magazine" Issue 3, pp. 1-16, 2007. Aurich, Germany, www.enercon.de.
Office Action issued in connection with Danish Application No. PA 2011 70378, Jun. 28, 2012.

\* cited by examiner

*Primary Examiner* — Stephen Gordon
(74) *Attorney, Agent, or Firm* — Dority & Manning, P.A.

(57) ABSTRACT

A transportation system and a method for transporting a rotor blade under a height-restricting obstacle defining a clearance height are disclosed. The method includes transporting a first end of the rotor blade under the height-restricting obstacle. A transportation vehicle is configured to transport the rotor blade, the transportation vehicle including a bed on which the rotor blade is disposed. The method further includes moving a second end of the rotor blade from a raised position to a lowered position relative to the bed, the second end in the lowered position having a height less than or equal to the clearance height, and transporting the second end of the rotor blade under the height-restricting obstacle.

11 Claims, 2 Drawing Sheets

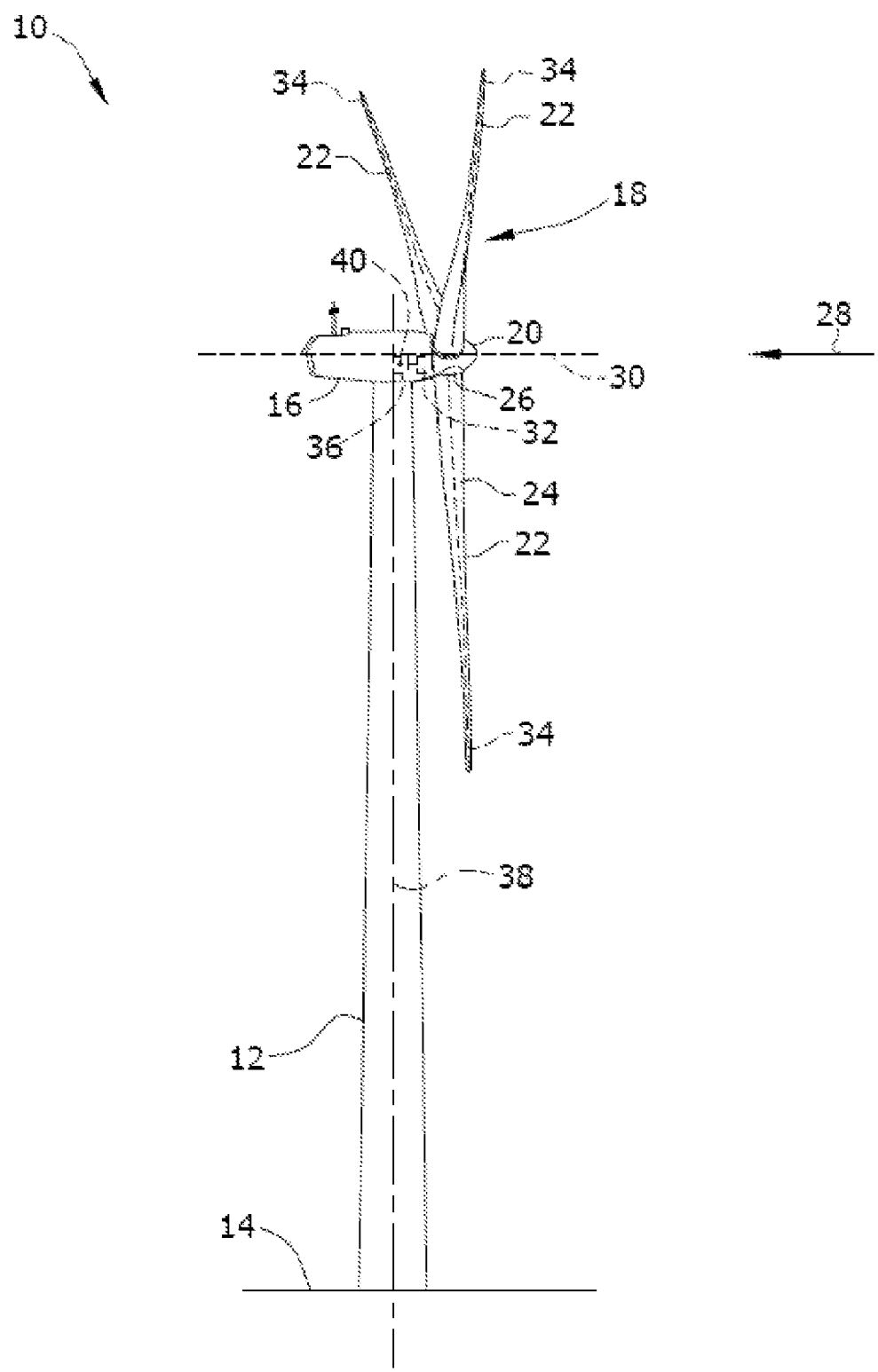
FIG. -1-

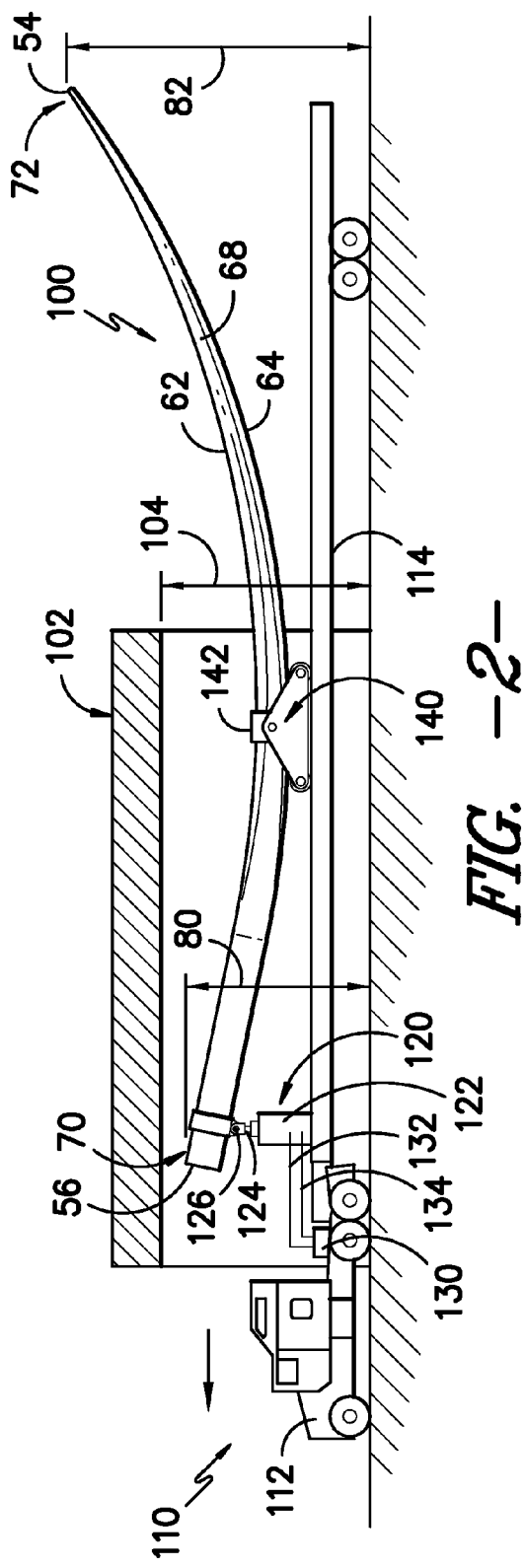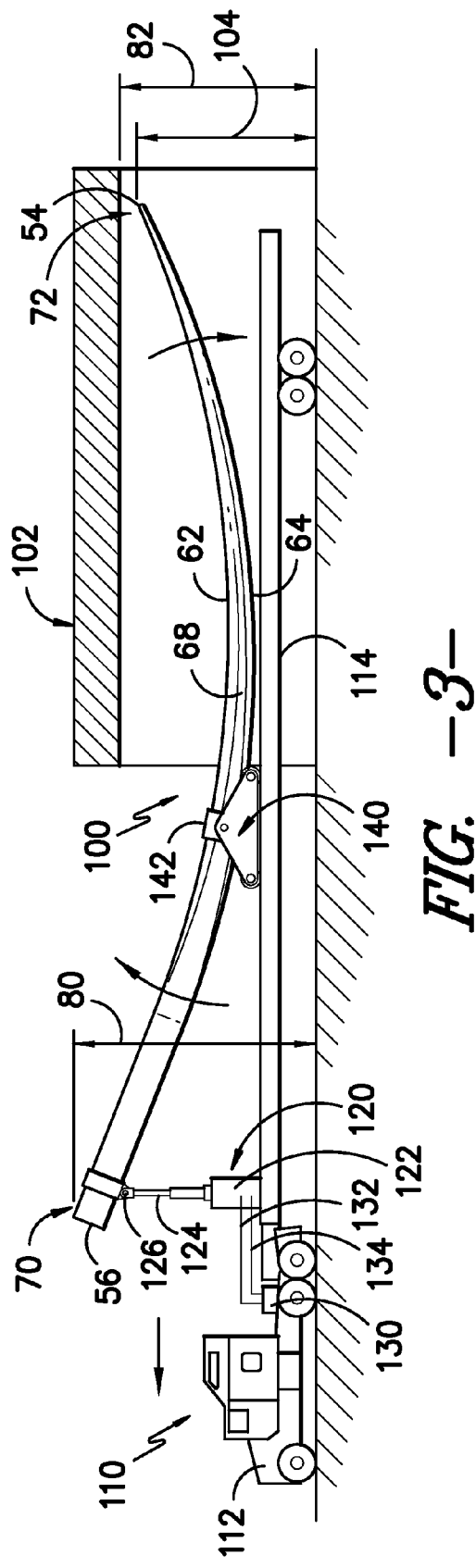

TURBINE COMPONENT TRANSPORTATION SYSTEM AND METHOD

FIELD OF THE INVENTION

The present disclosure relates in general to systems and methods for transporting turbine components, and more particularly to systems and methods for transporting wind turbine rotor blades under obstacles with height restrictions.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known foil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The size, shape, and weight of rotor blades are factors that contribute to energy efficiencies of wind turbines. An increase in rotor blade size increases the energy production of a wind turbine, while a decrease in weight also furthers the efficiency of a wind turbine. Presently, large commercial wind turbines in existence and in development are capable of generating from about 1.5 to about 12.5 megawatts of power. These larger wind turbines may have rotor blade assemblies larger than 90 meters in diameter. Accordingly, efforts to increase rotor blade size, decrease rotor blade weight, and increase rotor blade strength, while also improving rotor blade aerodynamics, aid in the continuing growth of wind turbine technology and the adoption of wind energy as an alternative energy source.

As the size of wind turbines increase, particularly the size of rotor blades, so do the respective costs of manufacturing, transporting, and assembling the wind turbines. The economic benefits of increased wind turbine sizes must be weighed against these factors. For example, the costs of preforming, transporting, and erecting a wind turbine having rotor blades in the range of 90 meters may significantly impact the economic advantage of the larger wind turbine.

For example, the costs of transporting rotor blades increase as the size of the rotor blades increase. One known method for transporting rotor blades involves the use of large trucks, such as tractor-trailers. The rotor blades are loaded onto trailers, which are hauled by the trucks to a desired destination. Frequently, however, this transportation method is hindered by the existence of height-restricting obstacles, such as bridges, that exist along various routes for hauling the rotor blades to a desired destination. For example, large, curved rotor blades with flapwise or edgewise bending may have clearance heights that are higher than the heights of the height-restricting obstacles, thus inhibiting the rotor blades from passing under the height-restricting obstacles.

One known solution to the problem of transporting a rotor blade under height-restricting obstacles involves turning the rotor blade sideways, such that the rotor blade is width-restricting rather than height-restricting, when the truck passes under a height-restricting obstacle. This solution, however, is expensive and time-consuming, requiring, for example, that oncoming traffic passing under the height-restricting obstacle be halted while the truck is passing through. An alternative solution involves loading the rotor blades into, for example, boats or barges, rather than trucks, and transporting the rotor blades along waterways to a desired destination. This solution, however, is also expensive and time-consuming, and frequently the desired destination of a rotor blade does not have waterways leading to it. A further alternative solution involves separating the rotor blades into smaller separate rotor blade components for transport. However, separating a rotor blade may weaken the fibers and/or other reinforcing structures within the rotor blade, thus undesirably weakening the rotor blade.

Accordingly, there is a need for a transportation system and method that allows for rotor blades and other large turbine components to pass under height-restricting obstacles. Further, a transportation system and method for rotor blades and other large turbine components that are relatively efficient, fast, and cost-effective would be desired.

BRIEF DESCRIPTION OF THE INVENTION

Aspects and advantages of the invention will be set forth in part in the following description, or may be obvious from the description, or may be learned through practice of the invention.

In one embodiment, a transportation system for transporting a rotor blade having a first end and a second end under a height-restricting obstacle having a clearance height is disclosed. The transportation system includes a transportation vehicle configured to transport the rotor blade, the transportation vehicle including a bed, the rotor blade disposed on the bed, and a lift mechanism associated with the transportation vehicle and the rotor blade, the lift mechanism configured to move the rotor blade between a lowered position and a raised position relative to the bed. The transportation system further includes a pivot point associated with the transportation vehicle and the rotor blade. The rotor blade pivots about the pivot point when the lift mechanism moves the rotor blade between the lowered position and the raised position.

In another embodiment, a method for transporting a rotor blade under a height-restricting obstacle defining a clearance height is disclosed. The method includes transporting a first end of the rotor blade under the height-restricting obstacle. A transportation vehicle is configured to transport the rotor blade, the transportation vehicle including a bed on which the rotor blade is disposed. The method further includes moving a second end of the rotor blade from a raised position to a lowered position relative to the bed, the second end in the lowered position having a height less than or equal to the clearance height, and transporting the second end of the rotor blade under the height-restricting obstacle.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a perspective view of an exemplary wind turbine;

FIG. 2 is a side view of one embodiment of the transportation system of the present disclosure with a first end of a rotor blade in a lowered position and a second end of the rotor blade in a raised position; and, FIG. 3 is a side view of one embodiment of the transportation system of the present disclosure with a first end of a rotor blade in a raised position and a second end of the rotor blade in a lowered position.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 is a perspective view of an exemplary wind turbine 10. In the exemplary embodiment, wind turbine 10 is a horizontal-axis wind turbine. Alternatively, wind turbine 10 may be a vertical-axis wind turbine. In the exemplary embodiment, wind turbine 10 includes a tower 12 that extends from a support surface 14, such as the ground or a platform or foundation, a nacelle 16 mounted on tower 12, and a rotor 18 that is coupled to nacelle 16. Rotor 18 includes a rotatable hub 20 and at least one rotor blade 22 coupled to and extending outward from hub 20. In the exemplary embodiment, rotor 18 has three rotor blades 22. In an alternative embodiment, rotor 18 includes more or less than three rotor blades 22. In the exemplary embodiment, tower 12 is fabricated from tubular steel to define a cavity (not shown in FIG. 1) between support surface 14 and nacelle 16. In an alternative embodiment, tower 12 is any suitable type of tower having any suitable height.

Rotor blades 22 are spaced about hub 20 to facilitate rotating rotor 18 to enable kinetic energy to be transferred from the wind into usable mechanical energy, and subsequently, electrical energy. Rotor blades 22 are mated to hub 20 by coupling a blade root portion 24 to hub 20 at a plurality of load transfer regions 26. Load transfer regions 26 have a hub load transfer region and a blade load transfer region (both not shown in FIG. 1). Loads induced to rotor blades 22 are transferred to hub 20 via load transfer regions 26. In one embodiment, rotor blades 22 have a length ranging from about 15 meters (m) to about 91 m. Alternatively, rotor blades 22 may have any suitable length that enables wind turbine 10 to function as described herein. For example, other non-limiting examples of blade lengths include 10 m or less, 20 m, 37 m, or a length that is greater than 91 m. As wind strikes rotor blades 22 from a direction 28, rotor 18 is rotated about an axis of rotation 30. As rotor blades 22 are rotated and subjected to centrifugal forces, rotor blades 22 are also subjected to various forces and moments. As such, rotor blades 22 may deflect and/or rotate from a neutral, or non-deflected, position to a deflected position. Moreover, a pitch angle or blade pitch of rotor blades 22, i.e., an angle that determines a perspective of rotor blades 22 with respect to direction 28 of the wind, may be changed by a pitch adjustment system 32 to control the load and power generated by wind turbine 10 by adjusting an angular position of at least one rotor blade 22 relative to wind vectors. Pitch axes 34 for rotor blades 22 are shown. During operation of wind turbine 10, pitch adjustment system 32 may change a blade pitch of rotor blades 22 such that rotor blades 22 are moved to a feathered position, such that the perspective of at least one rotor blade 22 relative to wind vectors provides a minimal surface area of rotor blade 22 to be oriented towards the wind vectors, which facilitates reducing a rotational speed of rotor 18 and/or facilitates a stall of rotor 18.

In the exemplary embodiment, a blade pitch of each rotor blade 22 is controlled individually by a control system 36. Alternatively, the blade pitch for all rotor blades 22 may be controlled simultaneously by control system 36. Further, in the exemplary embodiment, as direction 28 changes, a yaw direction of nacelle 16 may be controlled about a yaw axis 38 to position rotor blades 22 with respect to direction 28.

In the exemplary embodiment, control system 36 is shown as being centralized within nacelle 16, however, control system 36 may be a distributed system throughout wind turbine 10, on support surface 14, within a wind farm, and/or at a remote control center. Control system 36 includes a processor 40 configured to perform the methods and/or steps described herein. Further, many of the other components described herein include a processor. As used herein, the term "processor" is not limited to integrated circuits referred to in the art as a computer, but broadly refers to a controller, a microcontroller, a microcomputer, a programmable logic controller (PLC), an application specific integrated circuit, and other programmable circuits, and these terms are used interchangeably herein. It should be understood that a processor and/or a control system can also include memory, input channels, and/or output channels.

Referring to FIGS. 2 and 3, a rotor blade 22 in accordance with aspects of the present disclosure is illustrated. The rotor blade 22 may extend from a blade tip 54 to a blade root 56, and may include a pressure side 62 and a suction side 64 extending between a leading edge (not shown) and a trailing edge 68. In some embodiments, the rotor blade 22 may be separated into a variety of rotor blade 22 components. The present disclosure may also be utilized to transport the rotor blade 22 components, as desired.

The rotor blade 22 may, in exemplary embodiments, be curved. Curving of the rotor blade 22 may entail bending the rotor blade 22 in a generally flapwise direction, as shown in FIGS. 2 and 3, and/or in a generally edgewise direction. The flapwise direction is a direction substantially perpendicular to a transverse axis through a cross-section of the widest side of the rotor blade 22. Alternatively, the flapwise direction may be construed as the direction (or the opposite direction) in which the aerodynamic lift acts on the rotor blade 22. The edgewise direction is perpendicular to the flapwise direction. Flapwise curvature of the rotor blade 22 is also known as pre-bend, while edgewise curvature is also known as sweep. Thus, a curved rotor blade 22 may be pre-bent and/or swept. Curving may enable the rotor blade 22 to better withstand flapwise and edgewise loads during operation of the wind turbine 10, and may further provide clearance for the rotor blade 22 from the tower 12 during operation of the wind turbine 10.

The rotor blade 22 of the present disclosure may require transportation from, for example, a manufacturing location to an operation location, such as a wind farm. Further, the rotor blade 22 may be impeded during transportation by height-restricting obstacles such as bridges. For example, the rotor blade 22 may include a first end 70 and a second end 72. In some exemplary embodiments, the first end 70 may be adjacent the blade tip 54 and the second end 72 may be adjacent the blade root 56, or vice-versa. Alternatively, the first end 70 and second end 72 may be the leading edge and trailing edge 68, respectively, or vice-versa. Further, the first end 70 and second end 72 may generally be at any suitable locations on the rotor blade 22. The first end 70 and the second end 72 may each have a height 80 and 82 respectively, as discussed below. One or both of the heights 80 and 82 may be higher than the clearance height of a height-restricting obstacle.

Thus, as shown in FIGS. 2 and 3, a transportation system 100 is disclosed for transporting a rotor blade 22, or any other component of, for example, a wind turbine 10 or other turbine or machine, under a height-restricting obstacle 102 having a clearance height 104. It should be understood that the present disclosure is not limited to transportation systems 100 for transporting rotor blades 22. Rather, the transportation system 100 of the present disclosure may be utilized to transport any suitable component of any turbine system or machine under a height-restricting obstacle 102. In general, the components of the present disclosure may each have a first end 70, a second end 72, and respective heights 80 and 82.

The height-restricting obstacle 102 of the present disclosure may be, for example, a bridge, an overpass, or a similar structure. The height-restricting obstacle 102 may require, for example, that vehicles or other moving structures or objects passing under the structure have a height less than or equal to the clearance height 104 of the height-restricting obstacle 102, allowing the vehicles to fit under the height-restricting obstacle 102.

The transportation system 100 may include, for example, a transportation vehicle 110 configured to transport the rotor blade 22 or other component. The transportation vehicle 110 may be, for example, a truck, such as a tractor-trailer, or a car, a train, a boat, or any other suitable vehicle for transporting the rotor blade 22 or other component. The transportation vehicle 110 may include suitable components and accessories for transporting the rotor blade 22 or other component, such as suitable platforms for accommodating the rotor blade 22 or other component and suitable restraining devices for preventing the rotor blade 22 or other component from, for example, falling from the transportation vehicle 110. In an exemplary embodiment, the transportation vehicle 110 may be a tractor-trailer having a cab 112 and a bed 114, such as a trailer. The bed 114 may be of suitable size, and include suitable components and accessories, for accommodating and transporting the rotor blade 22 or other component disposed thereon. Further, the bed 114 may in exemplary embodiments allow the rotor blade 22 or other component to be moved relative to the bed 114, as discussed below. Alternatively, however, the bed 114 may be movable with the rotor blade 22 or other component.

The rotor blade 22 may generally be placed on the transportation vehicle such that the maximum curve of the rotor blade 22 extends vertically, as shown in FIGS. 2 and 3. For example, the rotor blade 22 may be curved, as discussed, having flapwise or edgewise bending. This bending may cause the rotor blade 22 to have a maximum curve. The maximum curve may be due to flapwise bending and/or edgewise bending. The rotor blade 22 may be positioned such that the portion of the rotor blade 22 with this maximum curve extends vertically.

The transportation system 100 may further include a lift mechanism 120. The lift mechanism 120 may be associated with the transportation vehicle 110 and the rotor blade 22 or other component. For example, the lift mechanism 120 may be mounted to the transportation vehicle 110, such as mounted to the bed 114 of the tractor-trailer in the exemplary embodiment, or may be separate from the transportation vehicle 120 and utilized in conjunction with the transportation vehicle 120 as required when the transportation system 100 encounters a height-restricting obstacle 102. For example, in alternative embodiments, the lift mechanism 120 may be a portable or fixed mechanism that is mounted to the ground or another vehicle adjacent the height-restricting obstacle 102.

The lift mechanism 120 may be configured to move the rotor blade 22 or other component between a lowered position and a raised position. For example, in exemplary embodiments, the lift mechanism 120 may by a pneumatic or hydraulic cylinder. The cylinder may include a barrel 122, a rod 124, and a rod head 126. The rod 124 may reciprocate in a generally linear fashion in reaction to the operation of an internal piston (not shown), the operation of which may be controlled by a control system generally 130, as discussed below. The rod head 126, disposed on the end of the rod 124 external of the barrel 122, may be associated with the rotor blade 22 or other component, such as with the first end 70 or the second end 72 thereof, as discussed below. As the rod 124 reciprocates in a linear fashion, the rotor blade 22 or other component, such as the first end 70 and/or the second end 72 thereof, may move or pivot between lowered positions and raised positions.

It should be understood that the lift mechanism 120 of the present disclosure is not limited to a pneumatic or hydraulic cylinder. For example, the lift mechanism 120 may be a rack-and-pinion system, a linear actuator, a rotary actuator, or any other suitable lift mechanism 120 that would operate to allow the rotor blade 22 or other component, such as the first end 70 and/or the second end 72, to move between lowered positions and raised positions.

Operation of the lift mechanism 120 may be controlled by a control system 130. For example, in embodiments where the lift mechanism 120 is a pneumatic or hydraulic cylinder, the control system 130 may regulate supply line 132 and return line 134, which may be configured to supply pneumatic or hydraulic fluid to the lift mechanism 120 and allow the pneumatic or hydraulic fluid to return from the lift mechanism 120, respectively. However, it should be understood that the control system 130 is not limited to applications involving pneumatic or hydraulic cylinders. Rather, the control system 130 may be suitable to control any suitable lift mechanism 120.

In some embodiments, the lift mechanism 120 may be operably connected to the transportation vehicle 110. For example, in an exemplary embodiment, as discussed below, the transportation vehicle 110 may be a tractor-trailer. The tractor-trailer may have various pneumatic or hydraulic systems, such as, for example, braking systems. The lift mechanism 120, such as the pneumatic or hydraulic cylinder, of the present disclosure may be operably connected to one or more of these systems. For example, supply line 132 and return line 134 may be coupled with or connected to various supply and return lines of the various pneumatic or hydraulic systems of the transportation vehicle 110. Alternatively, the lift mechanism 120 of the present disclosure may be operably connected to any system in the transportation vehicle 110. Thus, the lift mechanism 120 may be, for example, more efficiently utilized and controlled.

The transportation system 100 of the present disclosure may further include a pivot point 140. The pivot point 140 may be associated with the transportation vehicle 110 and the rotor blade 22 or other component. For example, the pivot point may be mounted to the transportation vehicle 110, such as mounted to the bed 114 of the tractor-trailer in the exemplary embodiment, or may be separate from the transportation vehicle 120 and utilized in conjunction with the transportation vehicle 120 as required when the transportation system 100 encounters a height-restricting obstacle 102.

In general, the pivot point 140 may be located between the first end 70 and the second end 72 of the rotor blade 22 or other component, to allow the rotor blade 22 or other component to pivot about the pivot point 140 when the first end 70 or second end 72 is moved. Further, the pivot point 140 may be positioned at a specific location between the first end 70 and the second end 72 based on the length of the rotor blade 22 or other component and/or the difference between the heights 80 and 82. For example, the location of the pivot point 140 may be a function of the rotor blade 22 or other component length and the difference between the heights 80 and 82, such that the pivot point 140 allows the transportation system 100 to operate properly and efficiently.

In some exemplary embodiments, the pivot point 140 may be movable on the transportation vehicle 110 via, for example, a track (not shown). The track may allow the pivot point 140 to be located relative to the rotor blade 22 or other component and/or may allow the pivot point 140 to move while the rotor blade 22 or other component is being pivoted about the pivot point 140.

The rotor blade 22 or other component may pivot about the pivot point 140 when the lift mechanism 120 moves the rotor blade 22 or other component, such as the first and/or second ends 70, 72 thereof, between lowered positions and raised positions. For example, in exemplary embodiments, the pivot point 140 may include a joint bearing 142. The joint bearing 142 may enable the rotor blade 22 or other component to pivot about the pivot point 140 with, for example, reduced friction. Alternatively, the pivot point 140 may include various other suitable components for enabling the pivoting of the rotor blade 22 or other component, such as components for assisting the rotor blade 22 or other component when it is pivoting or components for cushioning the rotor blade 22 or other component when it is disposed on the pivot point 140. Alternatively, the pivot point 140 may simply be a point on the rotor blade 22 or other component that is associated with the transportation vehicle 110, and which the rotor blade 22 or other component may pivot about.

The first end 70 of the rotor blade 22 or other component may have a height 80. In general, the height 80 may be defined from the ground, or from a reference point similar or identical to a reference point used to define the clearance height 104. In a lowered position, as shown in FIG. 2, the height 80 may be less than or equal to the clearance height 104 of the height-restricting obstacle 102. In a raised position, as shown in FIG. 3, the height 80 may be greater than the height 80 in the lowered position, such as, in some embodiments, greater than the clearance height 104. Thus, when the first end 70 is in the lowered position or, in some embodiments, in the raised position, at least the first end 70 of the rotor blade 22 or other component may be transported under a height-restricting obstacle 102. The second end 70 of the rotor blade 22 or other component may have a height 82. In general, the height 82 may be defined from the ground, or from a reference point similar or identical to a reference point used to define the clearance height 104. In a raised position, as shown in FIG. 2, the height 82 may be greater than the clearance height 104 of the height-restricting obstacle 102. In a lowered position, as shown in FIG. 3, the height 82 may be less than or equal to the clearance height 104 of the height-restricting obstacle 102. When the second end 72 is in the raised position, the second end 72 may be prevented from being transported under the height-restricting obstacle 102. Thus, as discussed below, the transportation system 100 may operate to move the second end 72 from the raised position to the lowered position, allowing the second end 72 to be transported under the height-restricting obstacle 102.

In an exemplary embodiment of the present disclosure, the lift mechanism 120 may be associated with the first end 70 of the rotor blade 22 or other component. The lift mechanism 120 may move the first end 70 between the lowered position and the raised position. Further, when the lift mechanism 120 moves the first end 70 from the lowered position to the raised position, the rotor blade 22 or other component may pivot about the pivot point 140. As the rotor blade 22 or other component pivots, the second end 72 may be moved from the raised position to the lowered position. When the second end 72 reaches the lowered position, the second end 72 may be at a height 82 such that the second end 72 may be transported under the height-restricting obstacle 102.

In an alternative embodiment, the lift mechanism 120 may be associated with the second end 72 of the rotor blade 22 or other component. The lift mechanism 120 may move the second end 72 between the lowered position and the raised position, and the rotor blade 22 or other component may pivot about the pivot point 140. When the second end 72 reaches the lowered position, the second end 72 may be at a height 82 such that the second end 72 may be transported under the height-restricting obstacle 102.

It should be understood that the transportation system 100 of the present disclosure is not limited to a lift mechanism 120 on either the first end 70 or the second end 72 of the rotor blade 22 or other component. For example, the transportation system 100 may include a lift mechanism 120 associated with the first end 70 and a lift mechanism 120 associated with the second end 72, and may further include other lift mechanisms 120 associated with other locations on the rotor blade 22 or other component as desired.

The present disclosure is further directed to a method for transporting a component, such as a rotor blade 22, of a turbine or other machine under a height-restricting obstacle 102 having a clearance height 104. The method may include the step of bringing the rotor blade 22 or other component to a height-restricting obstacle 102 having a clearance height 104. For example, a transportation system 100 may be provided for transporting the rotor blade 22 or other component to the height-restricting obstacle 102. The transportation system 100 may include a transportation vehicle 110, a lift mechanism 120, and a pivot point 140, as discussed above.

The method may further include positioning the first end 70 of the rotor blade 22 or other component in a lowered position. For example, in some embodiments, the first end 70 may be positioned in a lowered position with a height 80 such that the first end 70 may pass under the height-restricting obstacle 102.

The method may further include transporting a first end 70 of the rotor blade 22 or other component under the height-restricting obstacle 102, as discussed above.

The method may further include moving a second end 72 of the rotor blade 22 or other component from a raised position to a lowered position, as discussed above. In exemplary embodiments, moving the second end 72 from the raised position to the lowered position may include pivoting the rotor blade 22 or other component about a pivot point 140, as discussed above. Further, in exemplary embodiments, moving the second end 72 from the raised position to the lowered position may include actuating a lift mechanism 120 to lower the second end 72, as discussed above. For example, actuating the lift mechanism 120 may cause the rotor blade 22 or other component to pivot about the pivot point 140.

Further, the method may include moving the first end 70 of the rotor blade 22 or other component from a lowered position to a raised position, as discussed above. In exemplary embodiments, moving the first end 70 from the lowered position to the raised position may cause the second end 72 to move from the raised position to the lowered position.

In some embodiments, moving the second end 72 may occur after a predetermined portion of the rotor blade 22 or other component has cleared the height-restricting obstacle 102. For example, the predetermined portion may include the first end 70, and/or may include a certain length or portion of the rotor blade 22 or other component. In these embodiments, the second end 72 may not be moved from the raised position to the lowered position until the predetermined portion of the rotor blade 22 or other component is past and clear of the height-restricting obstacle 102.

The method of the present disclosure may further include the step of transporting the second end 72 under the height-restricting obstacle 102, as discussed above.

The transportation system 100 and method of the present disclosure provide relatively efficient, fast, and cost-effective strategies for transporting rotor blades 22 and other large turbine components under height-restricting obstacles. For example, large rotor blades 22 with height restrictions, such as curved rotor blades 22, could make use of the transportation system 100 and method of the present disclosure, resulting in relatively efficient, fast, and cost-effective strategies for transporting the rotor blades 22 from manufacturing locations to operation locations.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for transporting a rotor blade under a height-restricting obstacle defining a clearance height, comprising:
    transporting a first end of the rotor blade under the height-restricting obstacle, wherein a transportation vehicle is configured to transport the rotor blade, the transportation vehicle including a bed on which the rotor blade is disposed;
    moving a second end of the rotor blade from a second end raised position to a second end lowered position relative to the bed by pivoting the rotor blade about an axis transverse to a longitudinal axis of the transportation vehicle, the second end in the second end lowered position having a height less than or equal to the clearance height; and,
    transporting the second end of the rotor blade under the height-restricting obstacle.

2. The method of claim 1, further comprising positioning the first end of the rotor blade in a first end lowered position.

3. The method of claim 1, further comprising moving the first end from a first end lowered position to a first end raised position.

4. The method of claim 3, wherein the step of moving the first end from the first end lowered position to the first end raised position causes the second end to move from the second end raised position to the second end lowered position.

5. The method of claim 1, wherein the step of moving the second end from the second end raised position to the second end lowered position includes actuating a lift mechanism to lower the second end.

6. The method of claim 1, wherein the rotor blade is curved.

7. The method of claim 1, wherein the step of moving the second end occurs after a predetermined portion of the rotor blade has cleared the height-restricting obstacle.

8. A method for transporting a curved rotor blade under a height-restricting obstacle defining a clearance height, comprising:
    transporting a first end of the rotor blade under the height-restricting obstacle, wherein a transportation vehicle is configured to transport the rotor blade, the transportation vehicle including a bed on which the rotor blade is disposed;
    actuating a lift mechanism to lower a second end of the rotor blade generally linearly from a second end raised position to a second end lowered position relative to the bed, the second end in the second end raised position having a height greater than the clearance height and in the second end lowered position having a height less than or equal to the clearance height; and,
    transporting the second end of the rotor blade under the height-restricting obstacle.

9. The method of claim 8, wherein the lift mechanism is associated with the first end of the rotor blade.

10. The method of claim 8, wherein the step of actuating the lift mechanism causes the rotor blade to pivot about a pivot point.

11. The method of claim 8, wherein the step of actuating the lift mechanism raises the first end of the rotor blade from a first end lowered position to a first end raised position.

* * * * *